United States Patent [19]

Kim

[11] Patent Number: 5,479,561
[45] Date of Patent: Dec. 26, 1995

[54] BIT ALLOCATION METHOD IN SUBBAND CODING

[75] Inventor: Ga-yeong Kim, Kwangmyeong, Rep. of Korea

[73] Assignee: Samsung Electronics Co., Ltd., Kyungki-Do, Rep. of Korea

[21] Appl. No.: 54,211

[22] Filed: Apr. 30, 1993

[30] Foreign Application Priority Data

Sep. 21, 1992 [KR] Rep. of Korea .................. 92-17188

[51] Int. Cl.⁶ ........................................ G10L 9/00
[52] U.S. Cl. ........................... 395/2.38; 395/2.39
[58] Field of Search ................. 395/2.38, 2.39, 395/2, 2.12, 2.14, 2.1, 2.2; 381/30, 29, 34–47

[56] References Cited

U.S. PATENT DOCUMENTS

| | | | |
|---|---|---|---|
| 4,516,258 | 7/1985 | Ching et al. | 395/2.38 |
| 4,896,362 | 1/1990 | Veldhuis et al. | 395/2.38 |
| 5,105,463 | 4/1992 | Veldhuis et al. | 381/30 |
| 5,214,741 | 5/1993 | Akamine et al. | 381/30 |
| 5,365,553 | 11/1994 | Veldhuis et al. | 381/29 |
| 5,367,608 | 11/1994 | Veldhuis et al. | 395/2.39 |

FOREIGN PATENT DOCUMENTS

0457390A1 11/1991 European Pat. Off. .

Primary Examiner—Allen R. MacDonald
Assistant Examiner—Michael Sartori
Attorney, Agent, or Firm—Sughrue, Mion, Zinn, Macpeak & Seas

[57] ABSTRACT

The present invention relates to subband coding of an audio signal, and more particularly to a bit allocation method by consecutively increasing, one-by-one, the bits allocated to each subband, so that the bit difference between subbands can be decreased, thereby simplifying hardware. By allocating bits one-by-one in this fashion, the present invention is able to enhance coding efficiency and avoid the prior art drawback of needing two separate allocation algorithms. Moreover, in the present invention, after finishing the bit allocation, subbands whose allocated number of bits are "one" are searched for and then their bits are reallocated to other subbands, thereby further increasing the bit-utilization ratio.

3 Claims, 3 Drawing Sheets

BIT ALLOCATION METHOD IN SUBBAND CODING

BACKGROUND OF THE INVENTION

The present invention relates to subband coding of an audio signal, and more particularly to a bit allocation method for enhancing coding efficiency by decreasing each value of an initial bit allocation with respect to corresponding blocks of subbands.

Various audio coding methods for processing audio signals have been suggested such as utilizing statistical characteristics of a temporal or frequency region of the audio signal and the characteristics of the human auditory system. The types of audio coding methods include a waveform coding method for coding the instantaneous amplitude of audio signals; an analysis-synthesis coding method, wherein an audio generating apparatus is approximated to a model in compliance with an audio source and vocal path characteristic, and audio is displayed by a parameter of the approximation; and a high-efficiency transmission method by multiplexing, wherein the existence of an audio signal on the time axis is detected, and a silent section is compressed to realize the high-efficiency transmission.

Subband coding is a kind of waveform coding method, wherein an audio signal is split into a plurality of frequency bands, the signal of each band is down-sampled at the nyquist rate to thereby be converted into a low-band signal, and then adaptive pulse code modulation is performed on each low band signal. In coding each band, overall audio quality can be enhanced by allocating more quantization bits to a band in which audio signal energy is concentrated. Also of note, quantization noise affects only a split band without affecting other bands. The Comité Consultatif International Télégraphique et Téléphonique (CCITT) specifies, as a standard, a subband coding and adaptive differential PCM (SBC-ADPCM) system which codes an audio signal of a 7 KHz broad band into 64K bits (see G722).

Detailed descriptions of such subband codings of audio signals are presented in the following journals "*Journal of Audio Engineering Society,*" (Vol 27, No. 11, pp. 855–865, November 1979); "*The Bell System Technical Journal,*" (pp. 1633–1653, September 1981); and "*IEEE Transactions on Acoustics, Speech and Signal Processing,*" (Vol. ASSP-30, No. 5, pp. 751–765, October 1982).

In subband coding, an audio signal is split into subbands having a plurality of successive frequency bands via an analysis filter. Each subband signal $SB_m$ is quantized block-by-block via a quantizer. The quantized subband signal $QSB_m$ consists of a plurality of successive signal blocks, and each signal block has q-numbered samples. Respective samples in the signal block are quantized with an allocated number of bits $ab[m]$. Here, index m is an integer from 1 to M. The quantizer includes a bit-need determiner for determining a needed number of bits $bf[m]$ for a certain signal block in the respectively corresponding signal blocks in the subband signal $SB_m$. The needed number of bits $bf[m]$ is related to the number of bits which represents the samples of each signal block. In addition to this, the quantizer includes a bit allocator for allocating a number of bits TB, in order to obtain an allocated number of bits $ab[m]$ in response to the needed number of bits of the corresponding signal blocks in the subband signal. The bit reallocator eliminates components which are below a threshold Wm in accordance with a noise-masking curve of the human auditory system. The quantized signal blocks are temporally divided and multiplexed, and then transmitted.

The procedure for allocating the quantization bits to each subband will be described in detail with reference to European Patent No. 457,390 A1.

First, a number of bits needed for the quantization of each block signal, $bf[m]$, is determined. The needed number of bits $bf[m]$ is determined by a signal power $pwr\_m$ and a threshold Wm in each signal block of a subband signal.

Signal power $pwr\_m$ can be determined by the following equation:

$$pwr\_m = \frac{1}{q} \sum_{i=1}^{q} S_i^2$$

where $S_i$ represents the amplitude of the ith signal in a block having q-sample blocks in subband signal $SB_m$. All signal powers $pwr\_m$ for the corresponding blocks of subband signals from $SB_1$ to $SB_M$ are determined in accordance with the foregoing equation.

When all signal powers of the subband signals are produced, the signal powers can be expressed as a vector group $\{pwr\}$. By multiplying vector group $\{pwr\}$ by an M×M matrix $[D]$, and further adding a vector group $\{Wr\}$, a vector group $\{W\}$ can be obtained as shown below:

$$\{W\}=[D]\{pwr\}+\{Wr\}.$$

$[D]$ is a matrix of constants, whose coefficient $d_{ij}$ is multiplied by a signal power $pwr\_j$ of the q-sample blocks of a subband signal $SB_j$ in order to calculate the threshold of a subband signal $SB_i$ induced by the q-sample blocks of subband signal $SB_j$. $\{Wr\}$ represents the threshold of subband signal $SB_i$.

The needed number of bits $bf[m]$ is obtained by the following equation:

$$bf[m]=K_1 \log_2 (SFm^2/3Wm)^{1/2}$$

where, $K_1$ is a constant having a value of 1, and $SF_m$ is the largest sample value among the q-sample blocks of subband signal $SB_m$.

Thereafter, the available total number of bits TB allocable to all of the subbands is allocated among each of the subbands. The number of bits allocated to each subband, $ab[m]$, is determined according to the needed number of bits $bf[m]$. First, a subband jm which requires the largest number of bits among $bf[m]$, that is, $bf[1]$, $bf[2]$, ... $bf[M]$, is selected. Then, it is determined whether the allocated number of bits $ab[jm]$ of the selected subband is zero. If the allocated number of bits $ab[jm]$ equals zero, the following equations are executed:

$$bf[jm]=bj[jm]-b_1$$

$$ab[jm]=b_1$$

$$TB=TB-b_1$$

where TB denotes the available total number of bits allocable to every subband and $b_1$ is the number of bits allocated in this iteration of the allocation routine.

If $ab[jm]$ is not zero, the following operation is executed instead:

$$bf[jm]=bf[jm]-b_2$$

$$ab[jm]=ab[jm]+b_2$$

$$TB=TB-b_2$$

where $b_2$, like $b_1$ is an integer, and $b_1>b_2$.

The allocation of the needed number of bits bf[m] to each subband according to the above-described methods is repeated until no bit is left in the available total number of bits TB. During the process the number of bits allocable to any given subband is limited to stay within a maximum number of bits a_max.

It should be noted that the sample values of the q-sample blocks in the subband signal have sign bits. Accordingly, at least two bits (the sign bit and an effective bit) are required for quantizing the sample values. The allocated number of bits ab[m] is provided to quantize the q-sample blocks of each subband in such a manner that the $b_1$-bit (e.g., two bits) is allocated for a first allocation, and the $b_2$-bit (e.g., one bit) is allocated for a subsequent allocation. As stated above, the initially allocated number of bits $b_1$ is greater than the reallocated number of bits $b_2$.

Thus, in the conventional bit allocation operation, the allocated number of bits $b_1$ in the initial allocation routine is different from the number of bits $b_2$ in the subsequent reallocation. As will be described in greater detail hereinafter, the use of different numbers of bits in the initial allocation and the reallocation requires a separate algorithm, for each. This, in turn, contributes to complicate the overall system.

SUMMARY OF THE INVENTION

It is the object of the present invention to provide a simplified bit allocation method of subband coding of an audio signal which avoids the coding inefficiencies described above.

To achieve the object of the present invention, there is provided a bit allocation method in a subband coding method which enhances coding efficiency by using one and the same algorithm and apparatus in both an initial bit allocation routine and in subsequent bit reallocation routines. The method includes the steps of dividing digital data with a sampling frequency into a plurality of subband signals having successive frequency bands, dividing each subband signal into a plurality of blocks having q samples apiece, add allocating a number of bits ab[m], that is, ab[1], ab[2], . . . , ab[M], to each block for quantizing each sample, said bit allocation method comprising:

a first step of calculating a needed number of bits bf[m] required for quantization of the q samples for each block of each subband signal;

a second step of allocating one bit to every subband whose power is greater than a threshold;

a third step of selecting a subband $SB_{jm}$ whose needed number of bits bf[m] is the largest, replacing a needed number of bits bf[jm] with a value obtained by subtracting one from the needed number of bits bf[jm], replacing an allocated number of bits ab[jm] with a value obtained by adding one to the allocated number of bits ab[jm], and replacing the available total number of bits TB allocable to all of the blocks with a value obtained by subtracting one from the total number of bits TB;

a fourth step of returning to the third step when the available total number of bits TB is more than or equal to one by checking the available total number of bits TB; and a fifth step of replacing the allocated number of bits ab[m] with a value obtained by subtracting one from the allocated number of bits ab[m], replacing the available total number of bits TB with a value obtained by adding the number of subbands K, whose allocated number of bits ab[m] is one, to the available total number of bits TB, and returning to the third step, when the presence of a subband whose allocated number of bits ab[m] equals one is checked under the state that the available total number of bits TB is below one. By allocating and reallocating bits one-by-one in the above-described fashion, the present invention is able to enhance coding efficiency and avoid the prior art's requirement for separate allocation and reallocation algorithms.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
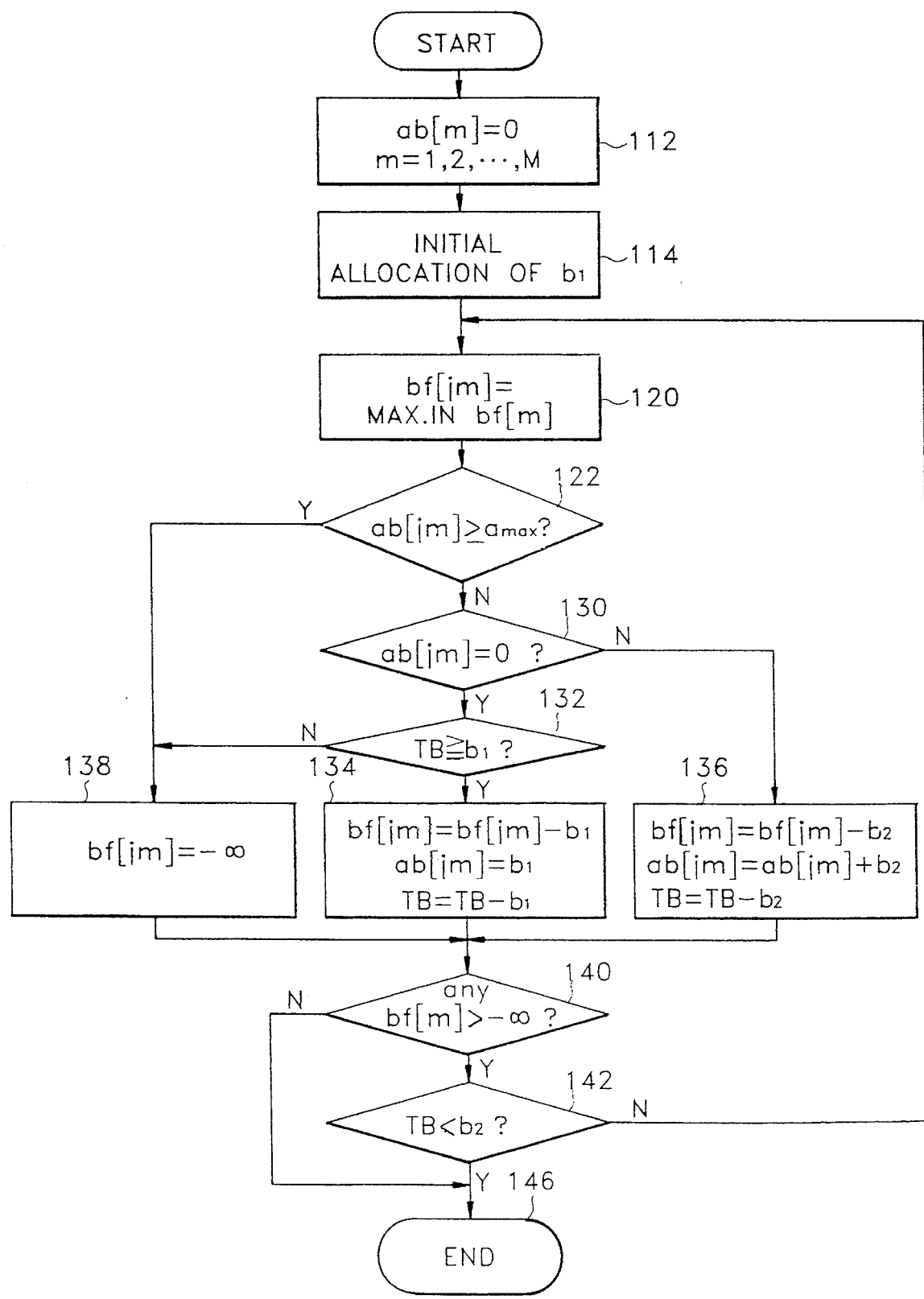
FIG. 1 is a flowchart showing a conventional bit allocation method.

Before performing a conventional bit allocation method shown in FIG. 1, the number of bits required for quantizing a block having q-numbered samples in each subband signal, i.e., the needed number of bits bf[m], is determined. Here, "q" is assumed as being one, for convenience.

First, an allocated number of bits ab[m], which represents the number of bits allocated to the block of each subband signal, is initialized to zero (step 112).

An initially allocated number of bits $b_1$ is allocated, amount respective blocks in the subbands, to the allocated number of bits ab[m] of a block of a subband signal $SB_m$ whose signal power pwr_m is greater than a threshold Wm. Here, the initially allocated number of bits $b_1$ is an integer having a value greater than 1, e.g., 2 (step 114).

A needed number of bits having the largest value among the corresponding blocks of respective subbands is selected, and its index jm is obtained. Here, bf[jm] is a needed number of bits bf[m] of a subband jm which has the largest needed number of bits (step 120).

Then it is determined whether the allocated number of bits ab[jm] of subband jm is greater than the maximum allocated number of bits a_max. If the allocated number of bits ab[jm] is greater than the maximum allocated number of bits a_max, the program branches to step 138 since more bits cannot be allocated to the searched block (step 122).

If the allocated number of bits ab[jm] is smaller than the maximum allocated number of bits a_max, it is checked whether the allocated number of bits ab[jm] equals zero. When the allocated number of bits ab[jm] is not zero, the program branches to step 136 (step 130). Meanwhile, when the allocated number of bits ab[jm] equals zero, it is checked whether the available total number of bits TB is greater than or equal to the initially allocated number of bits $b_1$. If the available total number of bits TB is smaller than the initially allocated number of bits $b_1$, the program branches to step 138 (step 132).

If the available total number of bits TB is greater than or equal to the initially allocated number of bits $b_1$, then, the following operations are executed: the needed number of bits bf[jm] is replaced with a value obtained by subtracting the initially allocated number of bits $b_1$ from bf[jm]; the allocated number of bits ab[jm] is replaced with the initially allocated number of bits $b_1$; the available total number of bits TB is replaced with a value obtained by subtracting $b_1$ from TB; and the program proceeds to step 140 (step 134). Meanwhile, if step 136 is reached, the needed number of bits bf[jm] is replaced with a value obtained by subtracting the reallocated number of the bits $b_2$ from bf[jm]; allocated number of bits ab[jm] is replaced with a value obtained by adding $b_2$ to ab[jm]; TB is replaced with a value obtained by subtracting $b_2$ from the available total number of bits TB; and the program proceeds to step 140 (step 136).

In step 138, the needed number of bits bf[jm] is changed into $-\infty$, and then the program proceeds to step 140.

All needed number of bits bf[m] are checked to see whether they are $-\infty$ or not. When all needed number of bits bf[m] are $-\infty$, the bit reallocating program is finished (step 140).

If there is a needed number of bits bf[m] which is not $-\infty$, it is checked whether or not the available total number of bits TB is larger than or equal to the reallocated number of bits $b_2$. When the available total number of bits TB is larger than or equal to the reallocated number of bits $b_2$, the program returns to step 120. If TB is smaller than $b_2$, the bit reallocating program is finished (step 142).

In summary, in the conventional bit allocation method shown in FIG. 1, it is checked whether the allocated number of bits ab[jm] is zero, to determine the initial allocation. Then, according to the determination, when the allocated number of bits ab[jm] is zero, i.e., for the initial allocation, an initially allocated number of bits $b_1$ is allocated in step 134. Conversely, if the allocated number of bits ab[jm] is not zero, a reallocated number of bits $b_2$ is allocated in accordance with step 136. This is because each sample of a block having q-numbered samples in a subblock has a sign bit, so that at least two bits are required for quantizing the respective samples with signs. The minimum allocated number of bits is satisfied by setting the initially allocated number of bits $b_1$ to two.

However, in hardware performing the bit allocation in accordance with the flowchart shown in FIG. 1, separate steps are required for performing the initial allocation and reallocation, which complicates the hardware.

Figure 2:
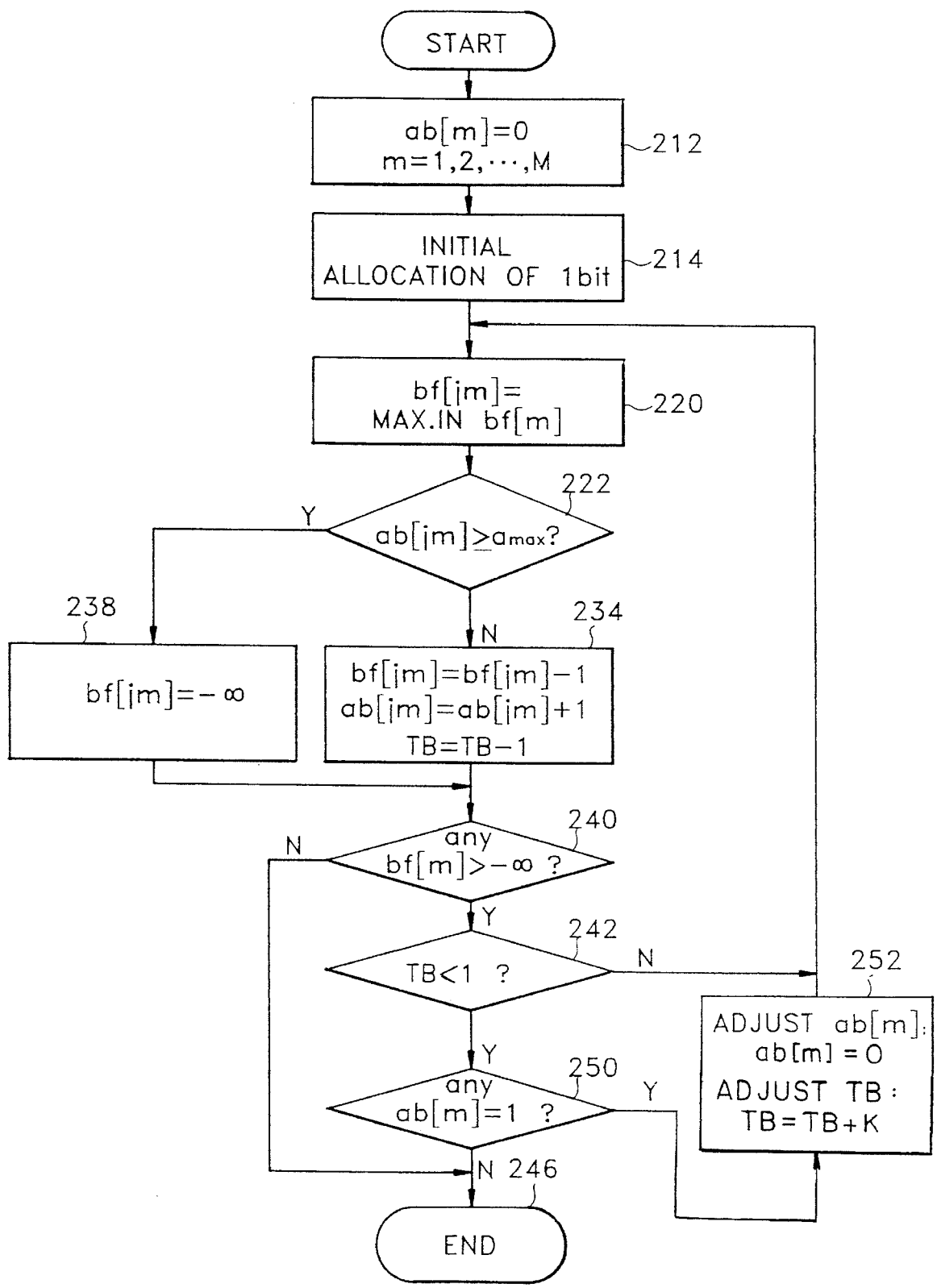
FIG. 2 is a flowchart showing a bit allocation method according to the present invention.

FIG. 2 is a flowchart for showing a bit allocation method according to the present invention. As will become more evident below, the present invention avoids the need for separate steps in performing the initial allocation and the reallocation.

First, an allocated number of bits ab[m] which represents the number of bits allocated to the block of each subband signal is initialized to zero (step 212).

The value "one" is allocated, amount respective blocks in the subbands, to an allocated number of bits ab[m] of a block of a subband whose signal power pwr_m is greater than a threshold Wm (step 214).

A needed number of bits having the largest value among the blocks of respective subbands is searched, and its index jm is obtained. Here, bf[jm] is a needed number of bits bf[m] of a subband which has the largest needed number of bits (step 220).

Then, it is determined whether the allocated number of bits ab[jm] of subband jm is greater than or equal to the maximum allocated number of bits a_max. If the allocated number of bits ab[jm] is greater than or equal to the maximum allocated number of bits a_max, the program branches to step 238 since no more bits can be allocated to the searched block (step 222). In step 238, the needed number of bits bf[jm] is changed into $-\infty$, and then the program proceeds to step 240.

If the allocated number of bits ab[jm] is smaller than the maximum allocated number bits a_max, then, the following operations are executed: the needed number of bits bf[jm] is replaced with a value obtained by subtracting "one" from bf[jm]; the allocated number of bits ab[jm] is replaced with a value obtained by adding "one" to the allocated number of bits ab[jm]; the available total number of bits TB is replaced with a value obtained by subtracting "one" from TB; and the program proceeds to step 240 (step 234).

At step 240, all needed number of bits bf[m] are checked for whether they are $-\infty$ or not. When all the needed number of bits bf[m] are $-\infty$, the bit reallocating program is finished (step 240).

If there is a needed number of bits bf[m] which is not $-\infty$, it is checked whether or not the available total number of bits TB is smaller than "one." When TB is not smaller than "one," the program returns to step 220 (step 242).

When the available total number of bits TB is smaller than "one", it is checked whether a subband whose allocated number of bits ab[m] equals "one" exists. If there is no subband whose allocated number of bits ab[m] equals "one", the bit reallocating program is finished (step 250).

When a subband whose allocated number of bits ab[m] equals "one" exists, the available total number of bits TB is replaced with a value obtained by adding up the number K of the subband whose allocated number of bits ab[m] is "one," and adding the number K to TB, then the allocated number of bits ab[m] is replaced with "zero" and, thereafter the program returns to step 220 (step 252).

Figure 3:
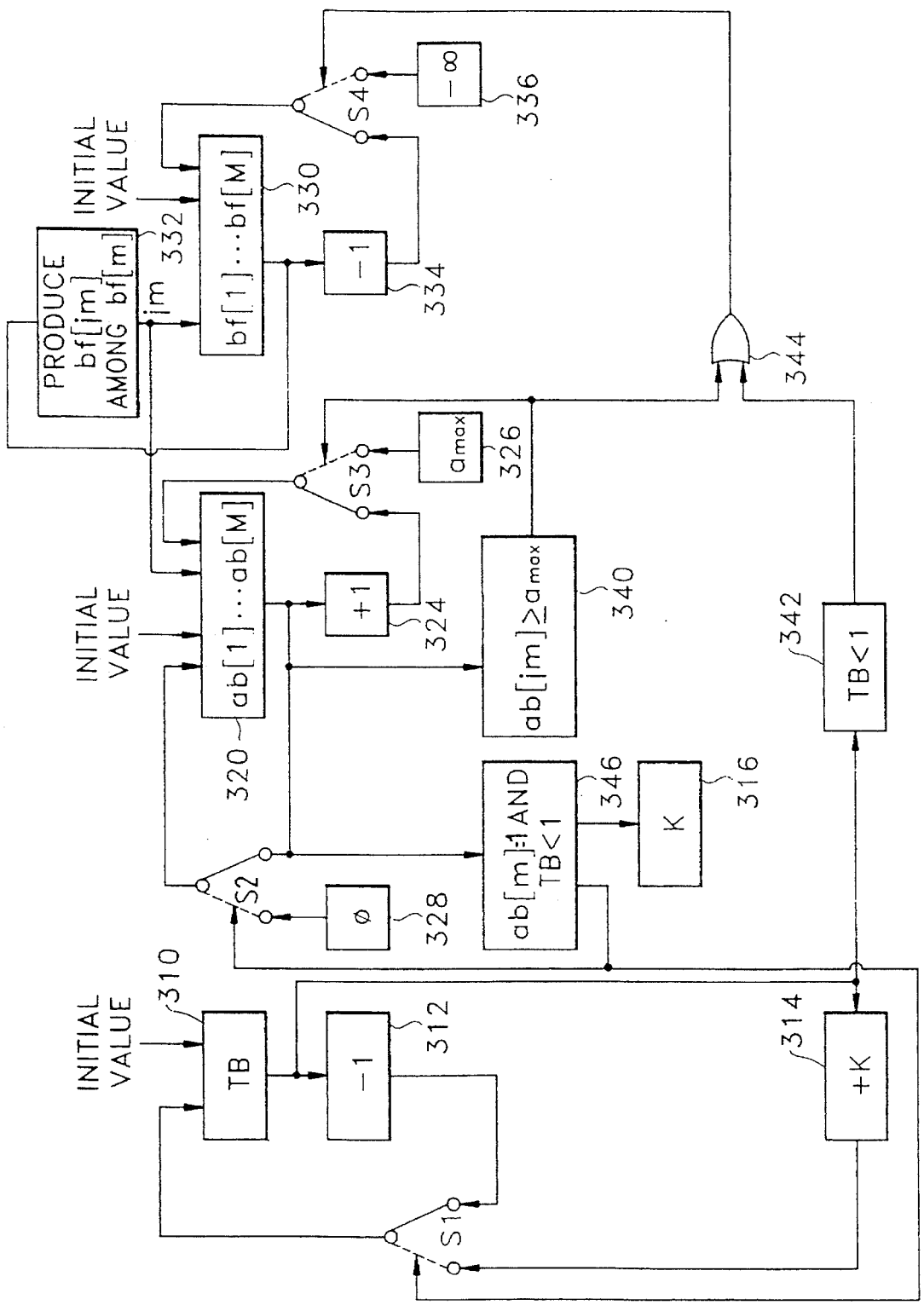
FIG. 3 is a block diagram showing an apparatus for performing the bit allocation program according to the flowchart shown in FIG. 2.

FIG. 3 is a block diagram showing an apparatus for performing the bit allocation program according to the flowchart shown in FIG. 2. The bit allocation apparatus shown in FIG. 3 has a first memory 310 which stores the available total number of bits TB. The available total number of bits TB is decrement-counted one-by-one via an operation path consisting of a first memory 310, a first subtractor 312 and a first switch S1. Also, the number K of the subbands whose allocated number of bits ab[m] is "one" in step 252 is increment-counted via the first memory 310, a first adder 314 and the first switch S1. A first comparator 342 detects the result whether or not the available total number of bits TB stored in the first memory is smaller than "one," and the result is supplied to an OR operator 344.

A second memory 320 stores the allocated number of bits ab[m]. The allocated number of bits ab[m] is increment-counted one-by-one via an operation path consisting of the second memory 320, a second adder 324 and a third switch S3. The replacement of the allocated number of bits ab[m] with "zero" in step 252 of FIG. 2 is executed via an operation path consisting of a third memory 328, a second switch S2 and the second memory 320.

A second comparator 346 receives the available total number of bits TB from the first memory 310 and the allocated number of bits ab[m] from the second memory 320 to thereby detect the number K of subbands which satisfy the condition (i.e., TB<1 and ab[m]=1), so that the detected number K is then supplied to a fourth memory 316.

A third comparator 340 receives both the allocated number of bits ab[jm] of subband SBjm, whose needed number of bits occupies the largest number among the bf[m], ab[jm] being stored in the second memory 320, and the maximum allocated number of bits a_max stored in a seventh memory 326. The comparator then checks whether the condition (i.e., ab[jm]≧a_max) is satisfied. Then, the result is supplied to an OR operator 344.

A fifth memory 330 stores the needed number of bits bf[m] of each subband. The needed number of bits bf[m] is decrement-counted one-by-one via an operational path consisting of the fifth memory 330, a second subtractor 334 and a fourth switch S4. The fourth switch S4 is driven by means of an output signal of the OR operator 344, and allows −∞ in a sixth memory 336 to be supplied to the needed number of bits bf[jm] when the allocated number of bits ab[jm] is more than or equal to the maximum allocated number of bits a_max or the available total number of bits TB is below "one."

A fourth comparator 332 detects index jm of the subband having the largest value among the needed number of bits bf[m] stored in the fifth memory 330, and supplies the detected value to the second memory 320 and the fifth memory 330.

In the bit allocation method according to the present invention, the bits allocated to the subband are consecutively increased one-by-one, so that the bit difference between subbands can be decreased. By allocating bits one-by-one (step 234 in FIG. 2), the present invention avoids the need for separate algorithms (steps 134 and 136 in FIG. 1) and also hardware.

Moreover, after the present invention finishes the bit allocation, subbands whose allocated number of bits are "one" are searched for, so their bits can be collected and then reallocated to other subbands. This further increases the bit-utilization ratio.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A bit allocation method in a subband coding method including the steps of dividing digital data with a sampling frequency into a plurality of M subband signals $SB_m$, where m=1 ... M, said M subband signals $SB_m$ having successive frequency bands, dividing each subband signal $SB_m$ into a plurality of blocks having q samples each, and allocating ab[m] bits to each block for quantizing each sample, said bit allocation method comprising:

a first step of calculating a needed number of bits bf[m] required for quantization of the q samples for each block of each subband signal $SB_m$;

a second step of selecting a subband $SB_{jm}$ from among the subband signals $SB_m$ whose needed number of bits bf[m] is largest among the result of said first step, replacing a needed number of bits bf[jm] for the selected subband $SB_{jm}$ with a value obtained by subtracting one from the needed number of bits bf[jm], replacing an allocated number of bits ab[jm] for the selected subband $SB_{jm}$ with a value obtained by adding one to the allocated number of bits ab[jm], and replacing an available total number of bits TB allocable to all blocks together with a value obtained by subtracting one from the total number of bits TB;

a third step of returning to said second step when the available total number of bits TB is greater than or equal to one, by checking the available total number of bits TB; and a fourth step of replacing the allocated number of bits ab[m] with a value obtained by subtracting one from the allocated number of bits ab[m], replacing the available total number of bits TB with a value obtained by adding a number of subbands K whose allocated number of bits ab[m] is one to the available total number of bits TB, and returning to said second step, said fourth step being performed when a presence of a subband whose allocated number of bits ab[m] equals one is ascertained under a condition that the available total number of bits TB is below one.

2. A bit allocation method as claimed in claim 1, further comprising, immediately after said first step, a step of allocating one bit to every subband signal $SB_m$ whose power is greater than a threshold.

3. A bit allocation method as claimed in claim 1, further comprising, immediately before said step of replacing the allocated number of bits ab[jm] for the selected subband $SB_{jm}$ with a value obtained by subtracting one from the allocated number of bits ab[jm] for the selected subband $SB_{jm}$ in said second step, a step of ending bit allocation when all of the allocated number of bits ab[jm] for the selected subband $SB_{jm}$ are greater than or equal to a maximum allocated number of bits a_max, by comparing the allocated number of bits ab[jm] for the selected subband $SB_{jm}$ with the maximum allocated number of bits a_max.

* * * * *